2,927,904

METHOD OF FOAMING BLEND OF CRYSTALLINE 1-OLEFIN POLYMER AND RUBBER AND PRODUCT OBTAINED THEREOF

William T. Cooper, Phillips, Tex., assignor to Phillips Petroleum Company, a corporation of Delaware No Drawing. Application November 19, 1956
Serial No. 622,791

9 Claims. (Cl. 260—2.5)

This invention relates to a new composition of matter and the method of preparing same. In one of its aspects, this invention relates to a rubbery cellular product comprising a blend of rubber and a highly crystalline 1-olefin polymer.

While it is known to prepare cellular or sponge rubber by incorporating a blowing agent therein prior to vulcanization, I have found that such products can be prepared from a blend of an elastomer such as unvulcanized natural or synthetic rubber with a 1-olefin polymer having a high degree of crystallinity. This is particularly surprising in view of the crystalline nature of the 1-olefin polymers. Compositions thus prepared are more resistant to deflection under load than similar compositions in which such 1-olefin polymers are not employed.

An object of this invention, therefore, is to provide a cellular rubbery composition resistant to deflection. Another object of this invention is to provide a method of producing cellular products comprising an elastomer and a highly crystalline 1-olefin polymer. Still other objects and advantages of this invention will be apparent to those skilled in the art having been given this disclosure.

According to this invention, rubbery cellular products are obtained by blending 1-olefin polymers having a crystallinity of at least 70 percent as determined at room temperature by nuclear magnetic resonance with elastomers such as natural or synthetic rubber, and a chemical blowing agent and thereafter heating the resulting blend to effect decomposition of the blowing agent and to cure the blown product to yield a cellular thermoset product.

Compositions thus prepared are more resistant to deflection under load than similar compositions prepared without the high crystalline 1-olefin polymer.

As has been indicated, the 1-olefin polymers which are applicable in this invention are those 1-olefin polymers having a high degree of crystallinity, say of at least 70 percent at room temperature and preferably of at least 80 percent as determined by nuclear magnetic resonance. These polymers have come into prominence in recent years and can be prepared by the method of Hogan et al., as disclosed and claimed in application Serial No. 476,306, filed December 20, 1954, now abandoned. However, my invention is not limited to any particular method for preparing these 1-olefin polymers and any such polymers meeting the requirement of crystallinity can be employed. These 1-olefin polymers are preferably homopolymers of those 1-olefins containing up to 8 carbon atoms per molecule. However, copolymers of these 1-olefins can be used, provided the crystallinity meets the above requirement. In general, at least one such 1-olefin should be present in the amount of at least 90 percent, since crystallinity falls rapidly when more than about 10 percent of a second copolymerizable material is present. The polymers prepared from 1-olefins of at least 3 carbon atoms per molecule of high crystallinity differ from the non-crystalline polymer in the regular or symmetrical arrangement of the molecule. With the higher molecular weight 1-olefins, both high crystalline and non-crystalline material will be formed which are readily separated by solvent extraction. Examples of suitable 1-olefins include ethylene, propylene, 1-butene, 1-pentene, 1-hexene, 1-octene, 4-methyl-1-pentene, 4-methyl-1-hexene, 4-ethyl-1-hexene, 6-methyl-1-heptene, 5-methyl-1-heptene, and the like. Both the homopolymers and copolymers of these 1-olefins are referred to herein as 1-olefin polymers, and it is to be understood that the term includes copolymers as well as homopolymers.

The method of Hogan et al. is particularly applicable to 1-olefins having a maximum of 8 carbon atoms per molecule and no branching nearer the double bond than the four-position, however, other olefin monomers can be polymerized by the process. According to that process, the olefin is polymerized at a temperature in the range of 100 to 500° F. in the presence of 0.1 to 10 or more weight percent chromium as chromium oxide, including a substantial proportion of hexavalent chromium, associated with at least one porous oxide selected from the group consisting of silica, alumina, zirconia and thoria. A preferred catalyst is one comprising 0.1 to 10 weight percent chromium as the oxide on a silica-alumina support such as 90 percent silica-10 percent alumina. This catalyst is ordinarily a highly oxidized catalyst which has been activated by high-temperature (e.g., 450–1500° F.) treatment under non-reducing conditions and preferably with an oxidizing gas, e.g., dry air. The polymerization is preferably carried out in the liquid phase such as in solution in a hydrocarbon solvent, especially a paraffin or naphthene which is liquid under the polymerization conditions of pressure and temperature. The polymerization products of ethylene alone or with small amounts, e.g., 10 percent or less, of other 1-olefins, as described when prepared by this described method will have the desired crystallinity for the present invention. In the case of homopolymers of ethylene the crystallinity of the polymer when prepared by the method of Hogan et al. will generally be well in excess of 90 percent. Other 1-olefins, when polymerized by the described method will form both high and low crystalline materials which are readily separable by selective solvent techniques. Suitable extractive solvents include acetone, ethyl acetate, ether, n-heptane, benzene and toluene.

Less preferred polymers of 1-olefins of the required properties can be produced with certain organometal catalysts, one particular system being disclosed in Belgian Patent 533,362, issued to Karl Ziegler, November 16, 1954. This patent discloses the polymerization of 1-olefins in the presence of triethylaluminum, plus titanium tetrachloride, mixture of ethylaluminum halide with titanium tetrachloride, and the like. However, it should be understood that the starting polymer can be obtained by any source so long as it meets the requirement of crystallinity.

Rubbery materials employed in the compositions of this invention include natural rubber and synthetic rubbery polymers of conjugated dienes having from 4 to 12 carbon atoms per molecule, exemplified by 1,3-butadiene, 2,3-dimethyl-1,3-butadiene, and the like, or the rubbery copolymers of these and similar conjugated dienes with each other or with copolymerizable monomeric materials containing a single ethylenic linkage such as styrene, alpha-methylstyrene, methyl acrylate, methyl methacrylate, ethyl acrylate, ethyl methacrylate, acrylonitrile, 2-methyl-5-vinylpyridine, or the rubbery polymers or copolymers of such conjugated dienes as chloroprene or similar materials. In general, such copolymers will be prepared from monomers comprising at least 50 percent by weight of the conjugated diene. Examples of such polymers include polybutadiene, butadiene-styrene copolymer, butadiene-methylvinylpyridine copolymer, homopolymer of chloroprene, copolymer of butadiene-methyl acrylate, etc.

The amount of 1-olefin polymer employed is generally in the range between 0.5 and 40 parts by weight per 100 parts of rubber-1-olefin blend.

Chemical blowing agents applicable in the practice of this invention are materials which decompose to yield gaseous products or compounds which will react with other ingredients in the composition at the vulcanizing temperature to produce one or more gaseous products. Included in the blowing agents which can be employed are p,p'-oxy-bis(benzenesulfonylhydrazine), diazoaminobenzene, dinitrosopentamethylenetetramine, 4-nitrobenzene sulfonic acid hydrazine, betanaphthalene sulfonic acid hydrazide, diphenyl-4,4'-di(sulfonyl azide) and mixtures of carbonate or bicarbonate such as sodium bicarbonate with a solid acid such as tartaric acid, stearic acid, oleic acid and the like. The amount of blowing agent employed will usually be in the range between 1 and 40 parts by weight per 100 parts of the polymeric materials, i.e., ethylene polymer and rubbery material.

Any of the conventional vulcanizing agents, fillers, pigments, plasticizers, and other compounding ingredients commonly used in the rubber industry can be incorporated in the polymer-rubber mixture. Sulfur is frequently used as a vulcanizing agent in conjunction with other vulcanization accelerators or activators. Antioxidants for the rubbery components can also be included in the compositions. Such compounding ingredients are conventional and need no further explanation here.

The vulcanized rubbery cellular products of this invention are prepared by blending the polymeric components by any suitable means, such as in a Banbury mixer or on a roll mill. Blending of the polymeric components is effected at a temperature above the softening point of the 1-olefin polymer. Temperatures in the range of 260 to 300° F. are generally suitable, especially with an ethylene polymer. The blowing agent and other compounding agents can be incorporated at the same time providing this temperature is below the decomposition of the blowing agent and blending can be effected without scorching as is known to the art. However, it is preferred that the blowing agent be added at a lower temperature subsequent to the blending of the polymeric materials and the vulcanizing agents and sulfur, if used, be added last to minimize or eliminate scorch. The mixture is then shaped, e.g., placed in a mold, and heated at a temperature to effect liberation of gas from the blowing agent and to effect set or vulcanization of the composition, a temperature of at least 300° F. will generally be used, however, lower temperatures for longer periods will also be operable as is understood by those skilled in the art. In general, the vulcanization temperature will be the same as that required to release gas from the blowing agent and will be above the blending temperature. This blowing temperature will generally be in the range of 300 to 400° F., however, higher temperatures can be employed so long as degeneration of the polymer or rubber does not take place.

As hereinbefore mentioned, the products are more resistant to deflection under load than are similar vulcanized rubber cellular products in which no ethylene polymer of the type described is present. When these ethylene polymers are employed in natural rubber compositions, the set acquired under compression is reduced, and when they are employed in synthetic rubber compositions, such as those prepared from butadiene/styrene copolymers, resistance to tear is increased.

As has been indicated, polymers of 1-olefins in general having the desired degree of crystallinity are applicable in this invention. However, homopolymers and copolymers of ethylene are especially useful in such polymers and are readily prepared by the aforementioned methods. For that reason, I shall illustrate this invention using a homopolymer of ethylene and a conventional butadiene-styrene rubbery copolymer. Such ethylene polymers will have a specific gravity of at least 0.94 and generally of at least 0.96.

In the following examples all compounding ingredients except the curative and blowing agent were mixed at 270° F. Curatives were added on the first cold remill and the blowing agent on the second cold remill. The stocks were given a total of two remills, both cold.

*Example I*

An ethylene stream comprising approximately 95 percent ethylene and the remaining material being primarily ethane with lesser amounts of methane and propane along with trace amounts of other hydrocarbons polymerized in a continuous process in the presence of a chromium oxide-silica-alumina catalyst according to the aforementioned method of Hogan et al. The ethylene stream is first admixed with cyclohexane as the solvent and continuously passed to a reactor having a temperature of about 285° F. and a pressure of about 420 p.s.i.a. Catalyst consisting of chromium oxide as about 2.5 percent chromium on a 90 percent silica-10 percent alumina support is also fed to the reactor to maintain a catalyst concentration of approximately 0.1 weight percent. This catalyst has been activated with air by calcining at about 950° F. The ethylene residence time is about 2 hours and the reactor effluent contains approximately 8 percent polymer. The effluent is first filtered to remove catalyst after which the polymer is recovered by coagulation, separated, dried and extruded. The polymer so produced has a density of 0.96 expressed in grams per cubic centimeter at room temperature and a crystallinity of over 90 percent, a softening temperature of about 260° F. and a melt index of 0.6.

Variable quantities of the ethylene polymer as prepared above were blended with a butadiene-styrene copolymer. This copolymer was prepared by emulsion polymerization at 41° F. and contained 23.5 weight percent bound styrene. The copolymer had a raw Mooney value (ML-4) of 55. The blends and also the copolymer above were compounded in accordance with the following recipe.

| | Parts by weight |
|---|---|
| Butadiene/styrene copolymer - ethylene polymer blends | 100–0, 95–45, 90–10, 80–20 |
| Plasticizer A [1] | 5 |
| Plasticizer B [2] | 45 |
| Stearic acid | 5 |
| Zinc oxide | 5 |
| Sodium bicarbonate | 20 |
| Heptylated diphenylamine | 1 |
| Carbon black [3] | 30 |
| Sulfur | 2 |
| Copper dimethyl dithiocarbamate | 0.3 |

[1] Mixture of 80 percent mineral oil, 15 percent sulfonated petroleum product, and 5 percent n-butyl alcohol (Reogen).
[2] Mixture of 98 percent selected mineral oil, 1.6 percent sulfonated petroleum product, 0.4 percent n-butyl alcohol (Plastogen).
[3] Medium abrasion furnace black.

The above recipe was designed to give 200 percent blow. The stocks were compounded and cured 30 minutes at 307° F. to give slabs approximately 0.3 inch in thickness. Determination of physical properties gave the following results:

| | Butadiene/styrene copolymer-Ethylene polymer Blend | | | |
|---|---|---|---|---|
| | 100/0 | 95/5 | 90/10 | 80/20 |
| Unaged Slabs: | | | | |
| Deflection, percent [1] | 13.6 | 8.6 | 4.9 | 5.3 |
| Compression set, percent [2] | 11.6 | 10.0 | 11.4 | 9.8 |
| Oven Aged 24 hrs. at 212° F.: | | | | |
| Deflection, percent | 5.2 | 2.8 | 2.0 | 3.0 |
| Shrinkage, percent [3] | 7.5 | 7.3 | 8.1 | 7.9 |
| Compression set, percent | 11.8 | 9.6 | 10.9 | 12.2 |

[1] Determined by measuring the slab thickness with a Randall and Stickney dial micrometer and then placing a 200 gram weight on the top of the micrometer shaft and recording the reduction in thickness.
[2] ASTM D395-40T, standard compression set test used except sponge pellets were piled up two layers thick.
[3] Determined by measuring a length of sponge slab before and after oven aging.

Resistance to tear improved with increasing amount of ethylene polymer as was determined by manually attempting to tear the prepared slabs.

*Example II*

Variable quantities of ethylene polymer as prepared in Example I were blended with natural rubber (pale crepe). All blends and also a sample of the crepe alone were compounded in accordance with the following recipe:

| | Parts by weight |
|---|---|
| Natural rubber-ethylene polymer blends 100/0, 95/5, 90/10, 80/20 | |
| Plasticizer [1] | 20 |
| Stearic acid | 10 |
| Zinc oxide | 5 |
| Sodium bicarbonate | 5 |
| Polymerized trimethyldihydroquinoline [2] | 1 |
| Hydroquinoline monobenzyl ether | 0.5 |
| Carbon black (medium abrasion furnace black) | 30 |
| Sulfur | 0.75 |
| Benzothiazyl disulfide | 1 |
| Tetramethyl thiuram disulfide | 0.25 |
| Tellurium-base secondary vulcanizing agent [3] | 0.5 |

[1] Same as plasticizer B of Example I.
[2] Agerite Resin D.
[3] Telloy.

The above recipe was designed to give 200 percent blow. The stocks were compounded and cured 30 minutes at 307° F. to give slabs approximately 0.3 inch in thickness. Determination of physical properties gave the following results:

| | Natural Rubber-Ethylene Polymer Blends | | | |
|---|---|---|---|---|
| | 100/0 | 95/5 | 90/10 | 80/20 |
| Unaged Slab: | | | | |
| Deflection, percent | 8.9 | 7.0 | 3.6 | 2.0 |
| Compression set, percent | 25.0 | 12.3 | 9.0 | 10.4 |
| Oven Aged 24 Hrs. at 212° F.: | | | | |
| Deflection, percent | 7.3 | 5.8 | 2.2 | 1.6 |
| Shrinkage, percent | 4.4 | 4.6 | 4.1 | 4.6 |
| Compression set, percent | 21.3 | 15.4 | 8.1 | 6.1 |

These tests were made as in Example I.

From both examples, it can be seen that the resistance to deflection is greatly improved by use of these high crystalline polymers over the unblended stocks.

I claim:

1. A method for preparing an improved cellular cured rubbery product which comprises blending 0.5 to 40 weight parts of a polymer prepared from 1-olefin monomers comprising at least 90 weight percent ethylene and said polymer having a specific gravity in the range of 0.94 to 0.96 with 99.5 to 60 weight parts of an uncured rubber selected from the group consisting of natural rubber and synthetic rubbers, said synthetic rubbers being prepared from monomers comprising at least 50 weight percent conjugated diene, said blending being carried out at a temperature above the softening point of said ethylene polymer, incorporating therein vulcanizing agent and 1 to 40 weight parts of a solid heat decomposable blowing agent per 100 parts of rubber plus 1-olefin polymer, shaping the blend and thereafter heating said blend at a temperature sufficient to release gas from said blowing agent and for a time sufficient to vulcanize said rubber-polymer blend.

2. The product as prepared by the method of claim 1.

3. A method for preparing an improved cellular cured rubbery product which comprises blending 0.5 to 40 weight parts of a homopolymer of ethylene prepared by polymerizing ethylene in the presence of a chromium oxide catalyst on a silica-alumina support so as to produce a polymer having a specific gravity of at least 0.96 and a crystallinity in the range of 0.94 to 0.96 with 99.5 to 60 weight parts of an uncured rubber selected from the group consisting of natural rubber and synthetic rubbers, said synthetic rubbers being prepared from monomers comprising at least 50 weight percent conjugated diene at a temperature in the range of 260 to 300° F., incorporating therein sulfur and a solid heat decomposable blowing agent selected from the group consisting of p,p,'-oxy-bis(benzenesulfonylhydrazine), diazoaminobenzene, dinitrosopentamethylene-tetramine, 4-nitrobenzene sulfonic acid hydrazine, beta-naphthalene sulfonic acid hydrazide, diphenyl-4,4'-di(sulfonyl azide) and mixtures of carbonates with a solid acid, shaping the resulting blend and subjecting the shaped blend to a temperature of at least 300° F. for a period of time until said blend is vulcanized.

4. The method of claim 3 wherein the rubber is natural rubber.

5. The method of claim 3 wherein the rubber is a copolymer of a conjugated diene and a copolymerizable monomer containing a sole ethylenic linkage, said copolymer being prepared from monomers comprising at least 50 weight percent conjugated diene.

6. The method of claim 3 wherein the blowing agent is sodium bicarbonate.

7. The method of claim 5 wherein the rubber is a copolymer of 1,3-butadiene and styrene.

8. The method of claim 5 wherein the rubber is a homopolymer of 1,3-butadiene.

9. A method for preparing an improved cellular cured, rubbery product which comprises blending 0.5 to 40 weight parts of a polymer of ethylene having a specific gravity in the range of 0.94 to 0.96 with 99.5 to 60 weight parts of an uncured rubber selected from the group consisting of natural rubber and synthetic rubbers, said synthetic rubbers being prepared from monomers comprising at least 50 weight percent conjugated diene, along with 1 to 40 weight parts of a solid heat decomposable blowing agent per 100 parts of rubber plus ethylene polymer; shaping the resulting blend; and subjecting the shaped blend to a temperature sufficiently high to release gas from said blowing agent and to vulcanize said blend.

References Cited in the file of this patent

UNITED STATES PATENTS

| 2,532,243 | Ott | Nov. 28, 1950 |
| 2,564,401 | Kelly | Aug. 14, 1951 |

OTHER REFERENCES

Raff et al.: "Polyethylene," Interscience Publishers Inc., N.Y. (1956), volume XI, pages 404 and 405.

UNITED STATES PATENT OFFICE

CERTIFICATE OF CORRECTION

Patent No. 2,927,904 March 8, 1960

William T. Cooper

It is hereby certified that error appears in the printed specification of the above numbered patent requiring correction and that the said Letters Patent should read as corrected below.

Column 6, lines 21 and 22, strike out "of at least 0.96 and a crystallinity".

Signed and sealed this 11th day of October 1960.

(SEAL)
Attest:
KARL H. AXLINE
Attesting Officer

ROBERT C. WATSON
Commissioner of Patents